US010009414B2

(12) United States Patent
Toillon et al.

(10) Patent No.: US 10,009,414 B2
(45) Date of Patent: Jun. 26, 2018

(54) HIERARCHICAL DISTRIBUTED ARCHITECTURE WITH MULTIPLE ACCESS TO SERVICES

(71) Applicant: THALES, Neuilly sur Seine (FR)

(72) Inventors: Patrice Toillon, Meudon la Foret (FR); David Faura, Meudon la Foret (FR)

(73) Assignee: THALES, Neuilly sur Seine (FR)

( * ) Notice: Subject to any disclaimer, the term of this patent is extended or adjusted under 35 U.S.C. 154(b) by 659 days.

(21) Appl. No.: 14/485,042

(22) Filed: Sep. 12, 2014

(65) Prior Publication Data

US 2015/0081759 A1 Mar. 19, 2015

(30) Foreign Application Priority Data

Sep. 13, 2013 (FR) ...................................... 13 02143

(51) Int. Cl.
H04L 29/08 (2006.01)
G06F 9/50 (2006.01)
(Continued)

(52) U.S. Cl.
CPC ............ *H04L 67/10* (2013.01); *G06F 9/5072* (2013.01); *G06F 21/121* (2013.01); *H04L 67/16* (2013.01);
(Continued)

(58) Field of Classification Search
CPC ....... H04L 67/10; H04L 67/16; G06F 9/5072; G06F 21/121
(Continued)

(56) References Cited

U.S. PATENT DOCUMENTS 8,964,555 B1* 2/2015 Miller ............... H04L 12/40136
370/235
8,984,177 B2* 3/2015 Einig .................. G06F 11/1658
710/10
(Continued)

FOREIGN PATENT DOCUMENTS

EP 2629459 A2 8/2013
FR 2921221 A1 9/2007

OTHER PUBLICATIONS

Erik Yu-Shing Hu, Eric Jenn & Nicolas Valot, Alejandro Alonso: Safety Critical Applications and Hard Real-Time Profile for Java: A Case Study in Avionics. 125-134.
(Continued)

*Primary Examiner* — Nicholas Taylor
*Assistant Examiner* — Chong G Kim
(74) *Attorney, Agent, or Firm* — Davidson, Davidson & Kappel, LLC

(57) ABSTRACT

A hierarchical distributed architecture including services and applications able to manage and/or process digital data by using the services. The architecture includes local service providers, each local provider being connected to one or several applications, and remote service providers, each remote provider being connected to one or several services, each application able to communicate with one or several services through a first hierarchical level including a local provider, and a second hierarchical level including at least one remote provider and each service is able to communicate with one or several applications through a first hierarchical level including a remote provider and a second hierarchical level including at least one local provider.

15 Claims, 2 Drawing Sheets

(51) Int. Cl.
*G06F 21/12* (2013.01)
*H04L 29/06* (2006.01)

(52) U.S. Cl.
CPC ...... *G06F 2221/2149* (2013.01); *H04L 63/10* (2013.01); *H04L 67/12* (2013.01); *H04L 67/40* (2013.01)

(58) Field of Classification Search
USPC .......................................................... 709/201
See application file for complete search history.

(56) References Cited

U.S. PATENT DOCUMENTS

| | | | |
|---|---|---|---|
| 9,137,038 B1* | 9/2015 | Mazuk | G06F 11/14 |
| 9,284,045 B1* | 3/2016 | Springer | G08G 5/003 |
| 2002/0032006 A1* | 3/2002 | Nair | H04B 7/18506 |
| | | | 455/430 |
| 2002/0144010 A1* | 10/2002 | Younis | G06F 9/546 |
| | | | 719/314 |
| 2005/0273662 A1* | 12/2005 | Yi | G06F 11/0739 |
| | | | 714/31 |
| 2006/0062143 A1* | 3/2006 | Bibby | G05D 1/0077 |
| | | | 370/225 |
| 2006/0215568 A1* | 9/2006 | Smith | H04L 43/12 |
| | | | 370/241 |
| 2007/0055416 A1* | 3/2007 | Allen | G08G 5/0021 |
| | | | 701/3 |
| 2007/0086348 A1* | 4/2007 | Paletou | H04L 12/4633 |
| | | | 370/241 |
| 2007/0115938 A1* | 5/2007 | Conzachi | G07C 5/008 |
| | | | 370/352 |
| 2007/0127460 A1* | 6/2007 | Wilber | H04L 67/12 |
| | | | 370/389 |
| 2007/0230330 A1* | 10/2007 | Dietz | H04L 49/15 |
| | | | 370/216 |
| 2008/0043768 A1* | 2/2008 | Lopez | H04L 47/2416 |
| | | | 370/412 |
| 2008/0313259 A1* | 12/2008 | Correa | G06Q 10/06375 |
| | | | 709/201 |
| 2010/0083277 A1* | 4/2010 | Malladi | G06F 9/541 |
| | | | 719/313 |
| 2010/0262715 A1* | 10/2010 | Tamalet | H04L 67/16 |
| | | | 709/238 |
| 2010/0292979 A1* | 11/2010 | Minot | G06F 17/5095 |
| | | | 703/21 |
| 2011/0010156 A1* | 1/2011 | Candia | H04L 12/4013 |
| | | | 703/13 |
| 2011/0238239 A1* | 9/2011 | Shuler | G06F 9/5077 |
| | | | 701/3 |
| 2011/0296379 A1* | 12/2011 | McCready | G06F 9/4421 |
| | | | 717/121 |
| 2012/0072482 A1* | 3/2012 | Causse | H04L 12/1863 |
| | | | 709/203 |
| 2012/0297492 A1* | 11/2012 | Court | G06F 9/468 |
| | | | 726/29 |
| 2013/0208630 A1* | 8/2013 | Bobrek | H04L 67/12 |
| | | | 370/276 |
| 2014/0130062 A1* | 5/2014 | Casteres | G09B 9/08 |
| | | | 719/313 |
| 2014/0313943 A1* | 10/2014 | Lopez | H04L 5/14 |
| | | | 370/276 |
| 2015/0003286 A1* | 1/2015 | Toillon | H04L 41/12 |
| | | | 370/254 |
| 2015/0016259 A1* | 1/2015 | Toillon | H04L 12/437 |
| | | | 370/235 |
| 2015/0019862 A1* | 1/2015 | Uczekaj | H04L 67/12 |
| | | | 713/155 |
| 2015/0161403 A1* | 6/2015 | Toillon | H04L 9/3236 |
| | | | 726/30 |
| 2016/0028835 A1* | 1/2016 | Morikawa | H04L 12/40189 |
| | | | 714/807 |
| 2016/0142480 A1* | 5/2016 | Toillon | H04L 67/1095 |
| | | | 709/248 |
| 2016/0173139 A1* | 6/2016 | Toillon | H04B 1/04 |
| | | | 375/295 |
| 2016/0218930 A1* | 7/2016 | Toillon | H04L 5/14 |

OTHER PUBLICATIONS

Daniel Tejera, Alejandro Alonso, Miguel A. de Miguel: RMI-HRT: Remote Method Invocation—Hard Real Time. 113-120.

* cited by examiner

HIERARCHICAL DISTRIBUTED ARCHITECTURE WITH MULTIPLE ACCESS TO SERVICES

This claims the benefit of French Patent Application FR 1302143, filed Sep. 13, 2013 and hereby incorporated by reference herein.

The present invention relates to a distributed hierarchical architecture of multiple accesses to services.

This architecture may for example be used in avionic systems.

More particularly, the invention relates to such a distributed hierarchical architecture of multiple accesses to services for avionic systems notably based on the integrated modular avionics concept (IMA), the architecture including:
  a computer avionic communications network;
  a plurality of services; and
  a plurality of applications, each application being capable of handling and/or processing digital by using at least one service.

BACKGROUND

A service is defined as being a pre-defined sequence of actions such as for example, recording data, reading the global time of the platform, reading a land map in a database, etc.

This sequence is carried out by a specific service provider allowing the carrying out of the sequence of actions by a set of software and/or hardware units. A service is accessible from one or several subscribed client applications via the distributed hierarchical architecture of multiple accesses to services.

When the service provider ends the service or a portion of the service (depending on the type of service) requested by the client application(s), the service provider either sends «or not» a result to the calling client application(s).

In the state of the art, thus, for example, systems based on the present integrated modular avionics concept (IMA for «Integrated Modular Avionics») (conventional) apply one or several services supporting one or several avionic applications (a very limited number) without applying communication resources between this(these) service(s) and the corresponding applications since this(these) service(s) is(are) only local to a physical module.

Access to the local service is accomplished via a programming interface (API for «Application Programming Interface») for only the application(s) hosted on the same physical module as the service.

The communication between applications within different physical modules is generally ensured by a computer avionic communications network connecting the corresponding modules.

The communication between applications is managed by using space and time partitioning properties of the data, allowing independent and deterministic processing operations and exchanges.

Such management is respectively based on the ARINC 653 and ARINC 664 standards.

The avionic applications are based on a model of exchanges of the «Publisher/Subscriber» type. These applications have access to a set of services only based on the ARINC 653 standard resorting to dedicated services localized on the same physical module as the applications.

SUMMARY OF THE INVENTION

However, these solutions have a certain number of drawbacks.

Notably, they do not allow one or several applications to make one or several concurrent calls, either local or remote, to one or several services.

In other words, they do not allow one or several applications to communicate with one or several services belonging to distinct physical modules connected via a computer network.

An object of the present invention is to propose a distributed hierarchical architecture solution of multiple accesses to services allowing one or several applications to make concurrent calls to one or several avionic services and this regardless of the localization of this or of these applications in the avionic system and regardless of the localization of the avionic services relatively to this or to these applications.

This hierarchical architecture uses the capabilities of the computer avionic communications network. It is designed so as to allow management of concurrent calls to services in order to guarantee access to the services according to pre-defined criteria for applications having subscribed to the services.

The present invention provides is a distributed hierarchical architecture of multiple accesses to services for avionic systems wherein:
  the architecture further includes a plurality of local service providers, each local service provider being connected to an application or to a group of applications, and a plurality of remote service providers, each remote service provider being connected to a service or to a group of services and being associated with an application or a group of applications;
  each application is able to communicate with one or several services through a first hierarchical level including a local service provider, and a second hierarchical level including at least one remote service provider; and
  each service is able to communicate with one or several applications through a first hierarchical level including a remote service provider, and a second hierarchical level including at least one local service provider.

According to particular embodiments of the invention, the system includes one or more of the following features:
  the communication between the applications and the services is entirely managed by local and remote service providers independently of the relevant application and service;
  the communication between the applications and the services is entirely managed by local service providers independently of the respective localization of the applications and of the services;
  each local service provider includes means for time and space management of the communication between each application connected to this local service provider and each service seen through the network;
  each remote service provider includes means for time and space management of the communication between each service connected to this remote service provider and each application seen through the network;
  the management means are associated with tables for configuring the access rights to the services and/or with tables for configuring the access rights to the applications;
  the configuration tables for the access rights to services and/or the configuration tables for access rights to the applications are predetermined during the design phase of the network;
  the network complies with the ARINC 664 standard;
  the communication between the various elements of the network is based on UDP/IP addressing;

it includes physical modules connected together in the network and defining the physical location of the local and remote service providers, of the applications and of the services;

it includes at least one physical module including:

one or several local service providers and the set of applications connected to these providers; and one or several remote service providers and the set of services connected to these providers, the remote service provider(s) being associated by configuration with one or several applications from the set of applications;

each local service provider further includes:

a logbook of requests able to list all the requests transmitted by each application or group of applications connected to this local service provider; and a logbook of replies able to list all the replies received for each application or group of applications connected to this local service provider;

each local service provider includes:

a queue of service requests for each application or group of applications associated with this local service provider able to receive requests from this application or from this group of applications;

a queue of requests for the services;

a queue of replies from these services;

a queue of replies for each application or group of applications associated with this local service provider able to send replies to this application or to this group of applications, each queue being managed by a configurable channel;

each local service provider connected to a group of applications is able to manage the multiple accesses of these applications to all the services, such a management supporting:

the partitioning of the requests from each application of the group to the services including the respective access rights to the services; and the partitioning of the replies from the services to each application of the group including the respective access rights to the applications;

the management further including:

configurable laws for managing and controlling queues of requests and queues of replies; and the registration of these requests and of these replies in the corresponding logbook;

each remote service provider further includes:

a logbook of requests able to list all the requests received from an application or a group of applications associated with this remote service provider; and a logbook of replies able to list all the replies transmitted through an application or a group of applications associated with this remote service provider;

each remote service provider includes:

a queue of requests for each application or group of applications associated with this remote service provider able to receive replies from this application or from this group of applications;

a queue of requests for each service, a queue of replies for each service, a queue of replies for each application or group of applications associated with this remote service provider able to send replies to this application or to this group of applications, each queue being managed by a configurable channel;

each remote service provider connected to a group of services is able to manage the multiple accesses of all the applications to these services, such a management supporting:

the partitioning of the requests of the applications to each service of the group including respective access rights to the services; and the partitioning of the replies of each service of the group to the applications including the respective access rights to the applications;

the management further including:

configurable laws for managing and controlling the queues of requests and the queues of replies; and registration of these requests and of these replies in the corresponding logbook.

the network is associated with a logbook for observing exchanges between the providers for the whole of the applications using a service.

BRIEF DESCRIPTION OF THE DRAWINGS

The invention will be better understood upon reading the description which follows, only given as an example and made with reference to the appended drawings, wherein.

DETAILED DESCRIPTION

Figure 1:
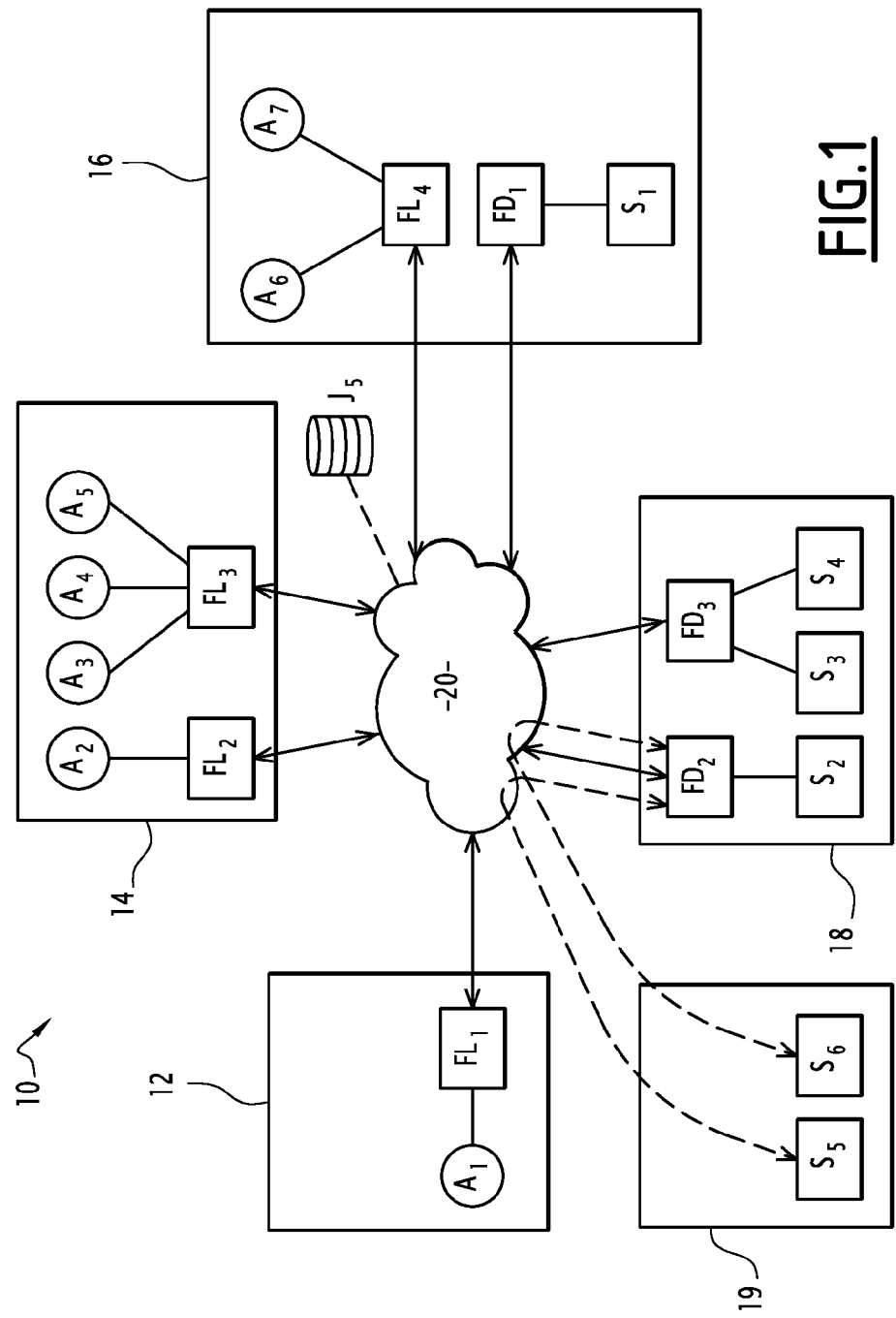
FIG. 1 is a schematic view illustrating a distributed hierarchical architecture of multiple accesses to services according to the invention.

An example of a distributed hierarchical architecture 10 of multiple accesses to services according to the invention was actually illustrated in FIG. 1.

This architecture may be used in avionic systems.

Such an architecture 10 for example includes five physical modules, designated by the general references 12, 14, 16, 18 and 19 in this FIG. 1.

These physical modules are for example loaded on board a same aircraft and connected together in a computer avionics communication network, designated by the general reference 20.

Of course, the architecture 10 may include other physical modules, not shown in FIG. 1.

The network 20 includes a plurality of hardware resources, such as for example cables physically connecting the physical modules with each other and for example switches ensuring transfer of digital data between the physical modules.

The network 20 also includes a plurality of immaterial resources ensuring such a transfer at a software level.

These resources are for example illustrated by processing resources, memory storage resources or communication resources.

The computer network 20 is for example compliant with the ARINC 664 communications standard.

The communication between the various elements of the computer network 20 is based on UDP/IP («User Datagram Protocol/Internet Protocol») addressing.

The architecture of the computer network 20 is able to support the integrated modular avionics concept (IMA for «Integrated Modular Avionics»).

This concept in particular allows support of several applications on the same processing resource.

Thus, in such an architecture 10 which may be used in avionics systems, an application is for example a piece of software for example applying the execution of tasks related to the piloting of the aircraft and to the monitoring of its vital systems.

Generally, such applications are distributed in a set of processing resources loaded on board in the form of physical modules.

Depending on their specific tasks, these applications may be redundant and/or meet a certain level of robustness.

Each application is able to manage and/or process digital data by using at least one service.

A service is defined as being a pre-defined sequence of actions such as for example recording of data, reading the global time of the platform, reading a land map in a database, etc.

This sequence is produced by a specific service provider allowing the carrying out of the sequence of actions by a set of software and/or hardware units. A service is accessible from an application or from a group of subscribed applications via the distributed hierarchical architecture 10 of multiple accesses to services.

Alternatively, a service is illustrated by a piece of software carrying out specific commands of an application.

The applications and the services are integrated into the physical modules 12, 14, 16, 18 and 19.

Thus for example, the module 12 includes a memory able to store an application $A_1$, the module 14 includes a memory able to store applications $A_2$, $A_3$, $A_4$ and $A_5$ and the module 16 includes a memory able to store applications $A_6$ and $A_7$.

Likewise, the module 16 includes a service $S_1$, the module 18 includes services $S_2$, $S_3$ and $S_4$ and the module 19 includes services $S_5$ and $S_6$.

Each application is able to communicate with one or several services through the computer network 20 by sending requests to this service or to this group of services.

Also, each service is able to communicate with one or several applications through the computer network 20 by sending replies to this application or to this group of applications.

Such a communication includes two hierarchical levels for example.

For this purpose, each application is connected to a local service provider representing a first hierarchical level.

Thus, in the exemplary embodiment of FIG. 1, the module 12 includes a local service provider $FL_1$ connected to the application $A_1$, the module 14 includes a local service provider $FL_2$ connected to the application $A_2$ and a local service provider $FL_3$ connected to the applications $A_3$, $A_4$ and $A_5$ and the module 16 includes a local service provider $FL_4$ connected to the applications $A_6$ and $A_7$.

It should be noted that each application is connected to a single local service provider.

The local service providers $FL_1$ and $FL_2$ are each connected to an application and the local service providers $FL_3$ and $FL_4$ are each connected to a group of applications (three and two applications respectively).

Each local service provider is directly connected to the computer network 20.

A second hierarchical level is formed by at least one remote service provider connected to at least one service.

Thus, in the exemplary embodiment of FIG. 1, the module 16 includes a remote service provider $FD_1$ connected to the service $S_1$, and the module 18 includes a remote service provider $FD_2$ connected to the service $S_2$ and a remote service provider $FD_3$ connected to the services $S_3$ and $S_4$.

The remote service provider $FD_2$ is also connected to the services $S_5$ and $S_6$ via the computer network 20. Thus, a remote service provider is able to be connected to a service or to a group of services not belonging to the physical module of this remote provider.

It should also be noted that each service is connected to a single remote service provider.

The remote service provider $FD_1$ is connected to a service and the remote service providers $FD_2$ and $FD_3$ are each connected to a group of services (three and two services respectively).

Each remote service provider is directly connected to the computer network 20.

In the architecture 10, the communication between the applications and the services is entirely managed by the local and remote service providers independently of the applications and of the services.

The topology of the network 10 is entirely defined during the construction phase of the network and cannot be changed during operation.

In other words, no new application or service appears during the operation of the network.

The local and remote service providers are also determined during the construction phase.

Further, each remote service provider is associated with an application or with a group of applications during the construction phase. Thus, such a remote service provider is able to only communicate with the application or the group of applications which is associated with it.

The network 10 is then a network with a static configuration.

Figure 2:
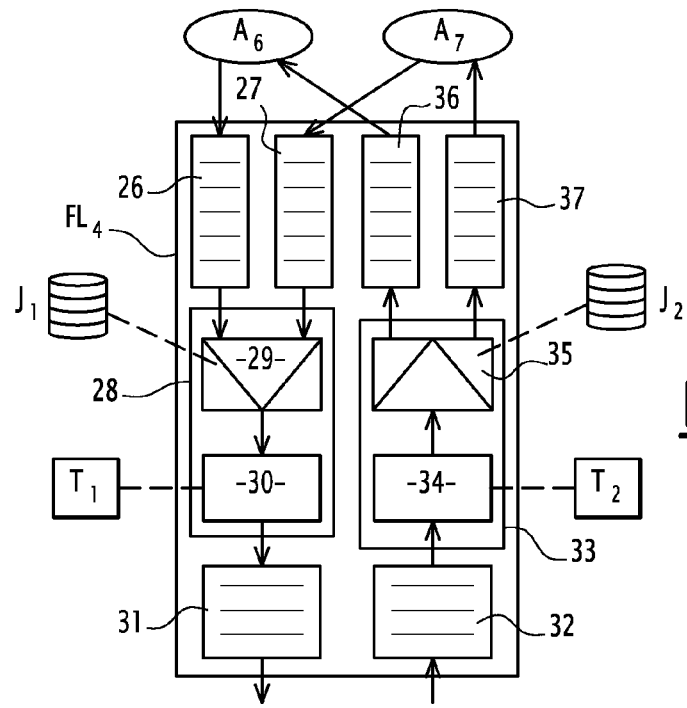
FIG. 2 is a schematic view illustrating the operation of a local service provider being part of the architecture of FIG. 1.

An example of a possible architecture for a local service provider is illustrated in FIG. 2.

In this FIG. 2, the architecture of the local service provider $FL_4$, connected to the applications $A_6$ and $A_7$ is actually illustrated.

Such an example allows an illustration of a partitioning of the multiple requests towards one or several services.

Of course, this example remains valid for all the other local service providers $FL_1$, $FL_2$ and $FL_3$ simply by changing the number of connected applications.

The provider $FL_4$ includes two queues 26 and 27 of requests for services formed by digital data representing transmitted requests by the applications $A_6$ and $A_7$ respectively. These requests include commands for one or several services.

The provider $FL_4$ further includes a first configurable channel 28 connected to both of these queues 26 and 27. The channel 28 is able to manage these queues.

More specifically, the channel is a resource or a set of resources capable of processing a set of queues of dissociated requests, i.e. without any order in time, according to a predefined processing law thereby allowing time ordering of these requests as well as of their controls.

For this purpose, the channel 28 includes means 29 for managing requests. These means give the possibility of processing the requests of two queues 26 and 27 according to management and control laws defined during the construction phase.

These means 29 further allow listing of all the requests transmitted by the corresponding applications in a logbook $J_1$.

The first configurable channel 28 also includes means 30 for checking the access rights of these requests to the requested services. This checking is carried out by means of a table $T_1$ for configuring the access rights to the services.

This table $T_1$ is able to be defined during the construction phase.

The provider $FL_4$ includes a queue 31 of requests able to receive requests from the first configurable channel 28.

It is also able to transmit these requests to the requested services.

In order to receive replies from the services to the requests, the provider $FL_4$ includes a queue 32 of replies from these services able to receive and store the replies.

The provider $FL_4$ further includes a second configurable channel 33 connected to this queue 32. The channel 33 is able to manage this queue.

The notion of channel mentioned above for the first configurable channel 28 is also applied to the second configurable channel 33 reciprocally for the queues of replies to the requests.

For this purpose, the second configurable channel 33 includes means 34 for checking the access rights of these replies to the corresponding applications. This checking is carried out by means of a configuration table $T_2$ of the access rights to the applications.

This table $T_2$ is able to be defined during the construction phase.

The channel 33 also includes means 35 for managing the replies. These means allow processing of the replies towards the corresponding applications according to the management and control laws defined during the construction phase.

These means 35 further allow listing of all the replies transmitted towards the corresponding applications in a logbook $J_2$.

Finally, the provider $FL_4$ includes two queues of replies 36 and 37 for replies received for the applications $A_6$ and $A_7$, respectively.

Both of these queues 36 and 37 are connected to the second configurable channel 33 able to receive processed replies from the queue 32 of replies from the services and to send them through the corresponding application.

Figure 3:
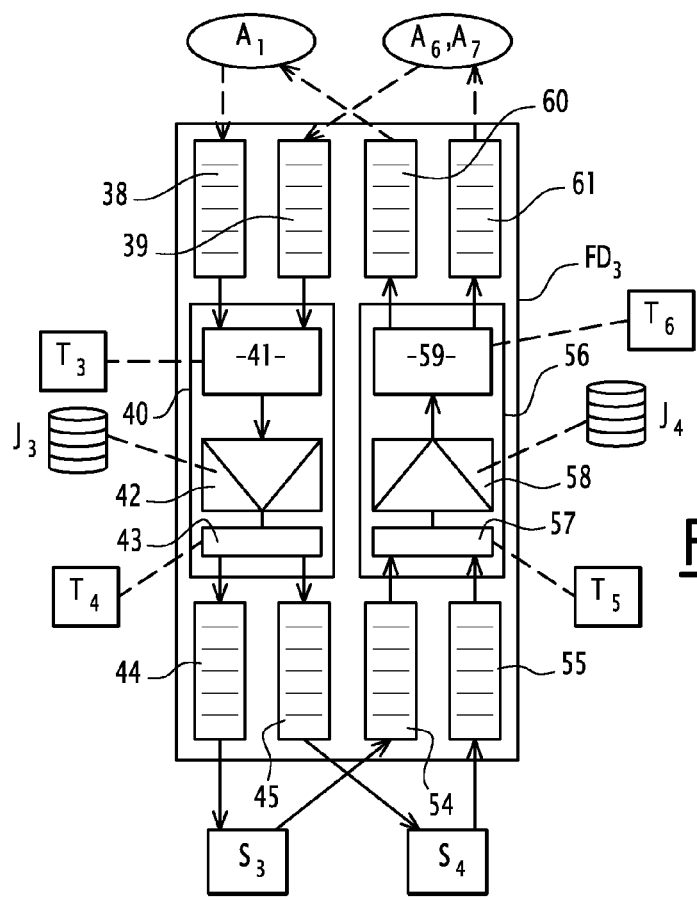
FIG. 3 is a schematic view illustrating the operation of a remote service provider being part of the architecture of FIG. 1.

An example of a possible architecture for a remote service provider is illustrated in FIG. 3.

In this FIG. 3, the architecture of the remote service provider $FD_3$ connected to the services $S_3$ and $S_4$ is actually illustrated. This provider is for example associated with the application $A_1$ and with a group of applications $A_6$ and $A_7$.

Such an example gives the possibility of illustrating a partitioning of the multiple replies towards one or several applications.

Of course, this example remains valid for the other remote service providers $FD_1$ and $FD_2$.

The provider $FD_3$ includes two queues 38 and 39 of requests able to respectively receive requests from the application $A_1$ and from the group of applications $A_6$ and $A_7$.

The provider $FD_3$ further includes a first configurable channel 40 connected to both of these queues 38 and 39. The channel 40 is able to manage these queues.

For this purpose, the channel 40 includes means 41 for checking the access rights of these requests to the requested services. This checking is carried out by means of a configuration table $T_3$ of the access rights to the services.

This table $T_3$ is able to be defined during the construction phase.

The channel 40 further includes means 42 for managing the requests. These means allow processing of the requests from the corresponding applications according to the management and control laws defined during the construction phase. This in particular allows a request to be directed to the requested service.

These means 42 further allow listing of all the received requests in a logbook $J_3$.

The channel 40 also includes means 43 for checking the access rights of the requests processed by the management means 42 to the requested services. This checking is carried out from a configuration table $T_4$ of the access rights to the services.

This table $T_4$ is able to be defined during the construction phase.

The provider $FD_3$ includes two queues 44 and 45 of requests able to receive processed requests for the services $S_3$ and $S_4$ respectively. These queues 44 and 45 are also able to send requests to the corresponding service.

Each service $S_3$ or $S_4$ is able to process a single request at a time. On the other hand, two distinct queues of requests 44 and 45 give the possibility to these services of operating independently of each other.

The provider $FD_3$ further includes two queues 54 and 55 of replies respectively from the services $S_3$ and $S_4$.

The provider $FD_3$ further includes a second configurable channel 56 connected to both of these queues 54 and 55. This channel 56 is able to manage these queues.

For this purpose, the channel 56 includes means 57 for checking the access rights of these replies to the corresponding applications. This checking is carried out by means of a configuration table $T_5$ of the access rights to the applications.

This table $T_5$ is able to be defined during the construction phase.

The channel 56 further includes means 58 for managing the replies. These means allow processing of the replies from the corresponding services according to management and control laws defined during the construction phase. This in particular allows a reply to be directed to an application or to a group of corresponding applications.

These means 58 further allow listing of all the replies transmitted by the corresponding services in a logbook $J_4$.

The channel 56 also includes means 59 for checking the access rights of the replies processed by the management means 58 to the requested applications. This checking is carried out by means of a configuration table $T_6$ of the access rights to the applications.

This table $T_6$ is able to be defined during the construction phase.

Finally, the provider $FD_3$ includes two queues 60 and 61 of replies able to receive processed replies for the application $A_1$ and the group of applications $A_6$ and $A_7$ respectively.

These queues 60 and 61 are also able to send the replies to the corresponding applications.

The network 20 also includes a logbook $J_5$ able to list all the requests and all the replies transmitted on the network 20.

The transfer time of the requests or of the replies in each local or remote service provider is entirely under control by this provider.

The transfer time of the requesting of the replies in the network 20 is entirely under control depending on the capabilities of the computer avionics communication network 20.

The maximum transfer time for each request or reply may be determined by means of the corresponding configuration tables.

Thus, no application or service is able to block or «monopolize» the network.

An application is not aware of the constraints of the architecture 10, only the local and remote service providers determine the access to the services requested by applications.

In the case of a failure of an application, the local service provider corresponding to this application blocks all the communications of this application with the network.

Also, in the case of a failure of a service, the latter is cut off from the remainder of the network by the corresponding remote service provider.

Of course, other embodiments of the local and remote service providers may be contemplated.

The operation of the architecture 10 of a computer network 20 according to the invention will now be described.

During the construction phase of the network, the topology of this network is defined.

Once the topology is known, each local service provider is connected to an application or to a group of applications.

Also, each remote service provider is connected to a service or to a group of services. Moreover, it is associated with an application or a group of applications.

Next, the configuration tables for accessing the services and the applications are defined for all the local and remote service providers.

Thus, in the example illustrated in FIGS. 2 and 3, the configuration tables for accessing the services $T_1$, $T_3$ and $T_4$ and the configuration tables for accessing the applications $T_2$, $T_5$ and $T_6$ are defined.

This in particular allows determination of the maximum transfer time of one request from an application to each service.

Also, this allows determination of the maximum transfer time of a reply from a service to each application.

Laws for managing and controlling the requests are moreover defined in the first configurable channel of each local or remote service provider.

Laws for managing and controlling the replies are also defined in the second configurable channel of each local or remote service provider.

Thus, for example, during the operation of the network 20, a request transmitted by the application $A_6$ and towards the service $S_3$ is first processed by the management means 29 and the checking means 30 of the local service provider $FL_4$.

This is the first hierarchical checking level.

Next, the request is transmitted via the network 20 as far as the remote service provider $FD_3$.

In this provider, the request passes through checking means 41 and then through management means 42 and finally through the checking means 43.

This is the second hierarchical checking level.

Thus, both hierarchical checking levels are independent which allows more effective detection of a non-authorized situation or a failure situation.

The request is moreover listed in the logbooks $J_1$, $J_5$ and $J_3$.

A reply transmitted by the service $S_3$ reaches the application $A_6$ also by passing through two hierarchical levels.

The first hierarchical level is formed by the checking means 57, the management means 58 and the checking means 59 within the remote service provider $FD_3$.

The second hierarchical level is formed by the checking means 34, the management means 35 within the local service provider $FL_4$.

The reply is moreover listed in the logbooks $J_4$, $J_5$ and $J_2$.

The complete independence of the architecture according to the present invention, described above, of the on-board physical modules, has a particular advantage.

Indeed, the physical modules are not expressed by any constraint on such an architecture.

The applications communicate with the services always in the same way, independently of their physical localization.

Thus, the exemplary embodiment of FIG. 1 illustrates a cohabitation of the applications $A_6$ and $A_7$ with the service $S_1$ in the same module 16.

Even in this case, the communication between the applications and the service is carried out via the outer network 20.

Of course other embodiments may further be contemplated.

What is claimed is:

1. A distributed hierarchical architecture of multiple accesses to services for avionic systems notably based on the integrated modular avionics concept, the architecture including:
   a computer avionics communication network;
   a plurality of services; and
   a plurality of applications, each application being able to manage or process digital data by using at least one service of the services;
   a plurality of local service providers, each local service provider being connected to one of the applications or to a group of the applications; and
   a plurality of remote service providers, each remote service provider being connected to one of the services or to a group of services and being associated with one of the applications or with a group of the applications;
   each application communicates with one or several of the services always through two hierarchical levels, a first hierarchical level including a local service provider of the plurality of local service providers, and a second hierarchical level including at least one remote service provider of the plurality of remote service providers;
   each service communicates with one or several of the applications always through two hierarchical levels, a first hierarchical level including a remote service provider of the plurality of remote service providers, and a second hierarchical level including at least one local service provider of the plurality of local service providers;
   a plurality of physical modules connected together in the network and defining a physical location of the local and remote service providers of the applications and of the services, wherein at least one of the plurality of physical module includes: at least one of the local service providers and the whole of the applications connected to the at least one local service provider, and at least one of the remote service providers and the whole of the services connected to the at least one remote service provider, the at least one remote service provider being associated by configuration with one or several applications of the whole of the applications, wherein the at least one local service provider is different from the at least one remote service provider;
   wherein the network is compliant with the ARINC 664 standard.

2. The architecture as recited in claim 1 wherein communication between the applications and the services is entirely managed by the local and remote service providers independently of the relevant application and service.

3. The architecture as recited in claim 1 wherein communication between the applications and the services is entirely managed by the local service providers independently of the respective localization of the applications and of the services.

4. The architecture as recited in claim 1 wherein each local service provider includes a manager for time and space management of the communication between each application connected to the respective local service provider and each service seen through the network.

5. The architecture as recited in claim 4 wherein each remote service provider includes a manager for time and space management of the communication between each service connected to the respective remote service provider and each application seen through the network.

6. The architecture as recited in 4 wherein the manager is associated with configuration tables of the access rights to the services or with configuration tables of the access rights to the applications.

7. The architecture as recited in claim 6 wherein the configuration tables of the access rights to the services or the configuration tables of the access rights to the applications are predetermined during the design phase of the network.

8. The architecture as recited in claim 1 wherein communication between the various elements of the network is based on UDP/IP addressing.

9. The architecture as recited in claim 1 wherein each local service provider further includes:
   a logbook of requests able to list all the requests transmitted by each application or group of applications connected to this local service provider; and
   a logbook of replies able to list all the replies received for each application or group of applications connected to this local service provider.

10. The architecture as recited in claim 1 wherein each local service provider includes:
   a queue of requests for services of each application or group of applications associated with the local service provider able to receive requests from the associated application or from the associated group of applications;
   a queue of requests for the services,
   a queue of replies from the services,
   a queue of replies for each application or group of applications associated with the local service provider able to send replies to the associated application or to the associated group of applications,
   each queue being managed by a configurable channel.

11. The architecture as recited in claim 10 wherein each local service provider connected to a group of applications is able to manage the multiple accesses of the applications to all the services, such a management supporting:
   partitioning of the requests for each application of the group to the services including respective access rights to the services; and
   partitioning of the replies from the services to each application of the group including the respective access rights to the applications;
the management further including:
   configurable management and control laws for the queues of requests and for the queues of replies; and
   registration of the queued requests and of the queued replies in the corresponding logbook.

12. The architecture as recited in claim 1 wherein each remote service provider further includes:
   a logbook of requests able to list all the requests received from an application or from a group of applications associated with this remote service provider; and
   a logbook of replies able to list all the replies transmitted to an application or to a group of applications associated with this remote service provider.

13. The architecture as recited in claim 1 wherein each remote service provider includes:
   a queue of requests for each application or group of applications associated with the remote service provider able to receive requests for this application or for the associated group of applications;
   a queue of requests for each service,
   a queue of replies from each service,
   a queue of replies for each application or group of applications associated with this remote service provider able to send replies to the associated application or to the associated group of applications, each queue being managed by a configurable channel.

14. The architecture as recited in claim 13 wherein each remote service provider connected to a group of services is able to manage the multiple accesses of all the applications to these services, such management supporting:
   partitioning of the requests of the applications to each service of the group including respective access rights to the services; and
   partitioning of the replies of each service of the group to the applications including the respective access rights to the applications;
the management further including:
   configurable management and control laws for the queues of requests and the queues of replies; and
   registration of the queued requests and of the queued replies in the corresponding logbook.

15. The architecture as recited in claim 1 wherein the network is associated with a logbook for observing the exchanges between the providers for the whole of the applications using a respective service of the services.

* * * * *